US008135922B2

(12) United States Patent
Cohn

(10) Patent No.: US 8,135,922 B2
(45) Date of Patent: Mar. 13, 2012

(54) APPARATUS AND METHOD TO VALIDATE THE CONFIGURATION OF AN INFORMATION STORAGE AND RETRIEVAL SYSTEM

(75) Inventor: Jeremy A. Cohn, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1671 days.

(21) Appl. No.: 10/984,432

(22) Filed: Nov. 8, 2004

(65) Prior Publication Data

US 2006/0101220 A1    May 11, 2006

(51) Int. Cl.
*G06F 12/00* (2006.01)
*G06F 13/00* (2006.01)
(52) U.S. Cl. ........................ 711/154; 711/100; 711/200
(58) Field of Classification Search .................. 711/154, 711/100, 200
See application file for complete search history.

(56) References Cited

U.S. PATENT DOCUMENTS

| | | | |
|---|---|---|---|
| 6,269,423 B1 | 7/2001 | Kishi | |
| 6,633,963 B1 | 10/2003 | Ellison et al. | |
| 2002/0023097 A1 | 2/2002 | Ripley | |
| 2002/0156951 A1* | 10/2002 | Beeston et al. | 710/104 |
| 2003/0028729 A1* | 2/2003 | Yamamoto et al. | 711/130 |
| 2003/0135842 A1 | 7/2003 | Frey et al. | |

OTHER PUBLICATIONS

Preston, Curtis W., "Using SANs and NAS", 2002, O'Reilly & Associates, First Edition, p. 128, (3 pages).*

* cited by examiner

*Primary Examiner* — Tuan V. Thai
(74) *Attorney, Agent, or Firm* — Dale F. Regelman; Quarles & Brady LLP

(57) ABSTRACT

A method is disclosed to validate the configuration of an information storage and retrieval system. The method provides a source information storage and retrieval system, a target information storage and retrieval system, and a master controller capable of communicating with the source information storage and retrieval system and with the target information storage and retrieval system. The method sequentially determines if each of the physical objects and logical objects disposed in the source information storage and retrieval system is also found in the target information storage and retrieval system.

33 Claims, 5 Drawing Sheets

APPARATUS AND METHOD TO VALIDATE THE CONFIGURATION OF AN INFORMATION STORAGE AND RETRIEVAL SYSTEM

FIELD OF THE INVENTION

This invention relates to an apparatus and method to validate the configuration of an information storage and retrieval system.

BACKGROUND OF THE INVENTION

Data storage and retrieval systems are used to store information provided by one or more host computer systems. Such data storage and retrieval systems receive requests to write information to one or more secondary storage devices, and requests to retrieve information from those one or more secondary storage devices. Upon receipt of a write request, the system stores information received from a host computer in a data cache. In certain implementations, a copy of that information is also stored in a nonvolatile storage device. Upon receipt of a read request, the system recalls information from the one or more secondary storage devices and moves that information to the data cache. Thus, the system is continuously moving information to and from storage devices, and to and from the data cache.

In certain data processing applications, data is copied to multiple individual information storage and retrievals systems. Such applications include, for example, peer-to-peer remote copy operations. In such applications, data is copied from a source information storage and retrieval system to a target information storage and retrieval system.

What is needed is an apparatus and method to verify the physical and/or logical configuration of a target information storage and retrieval system. Applicant's apparatus and method can verify the physical and logical configuration of a target system, and can, in certain instances, cure physical object and/or logical object conflicts that might otherwise cause a validation failure.

SUMMARY OF THE INVENTION

Applicant's invention includes an apparatus and method to validate the configuration of an information storage and retrieval system. The method provides a source information storage and retrieval system comprising (N) physical objects and (M) logical objects, a target information storage and retrieval system, and a master controller capable of communicating with the source information storage and retrieval system and with the target information storage and retrieval system, where that master controller comprises a processor, memory, an Overwrite Indicator, a Load Physical Indicator, and a Load Logical Indicator.

The method receives a command to validate the configuration of the target information storage and retrieval system, determines that said source information storage and retrieval system includes the (i)th physical object, where (i) is initially set to 1, and where (i) is greater than or equal to 1 and less than or equal to (N), and determines if the target information storage and retrieval system includes that (i)th physical object.

If the target information storage and retrieval system includes the (i)th physical object, the method then sequentially determines if each of the remaining physical objects disposed in the source information storage and retrieval system are also found in the target information storage and retrieval system.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes two clusters, a plurality of host adapters, a plurality of device adapters, and a data cache. The following description of Applicant's apparatus and method to validate the configuration of an information storage and retrieval system is not meant, however, to limit Applicant's invention to use in an information storage and retrieval system which comprises two clusters, a plurality of host adapters, a plurality of device adapters, and a data cache, as the invention herein can be applied to validating the configuration of information storage and retrieval systems in general.

Figure 5:
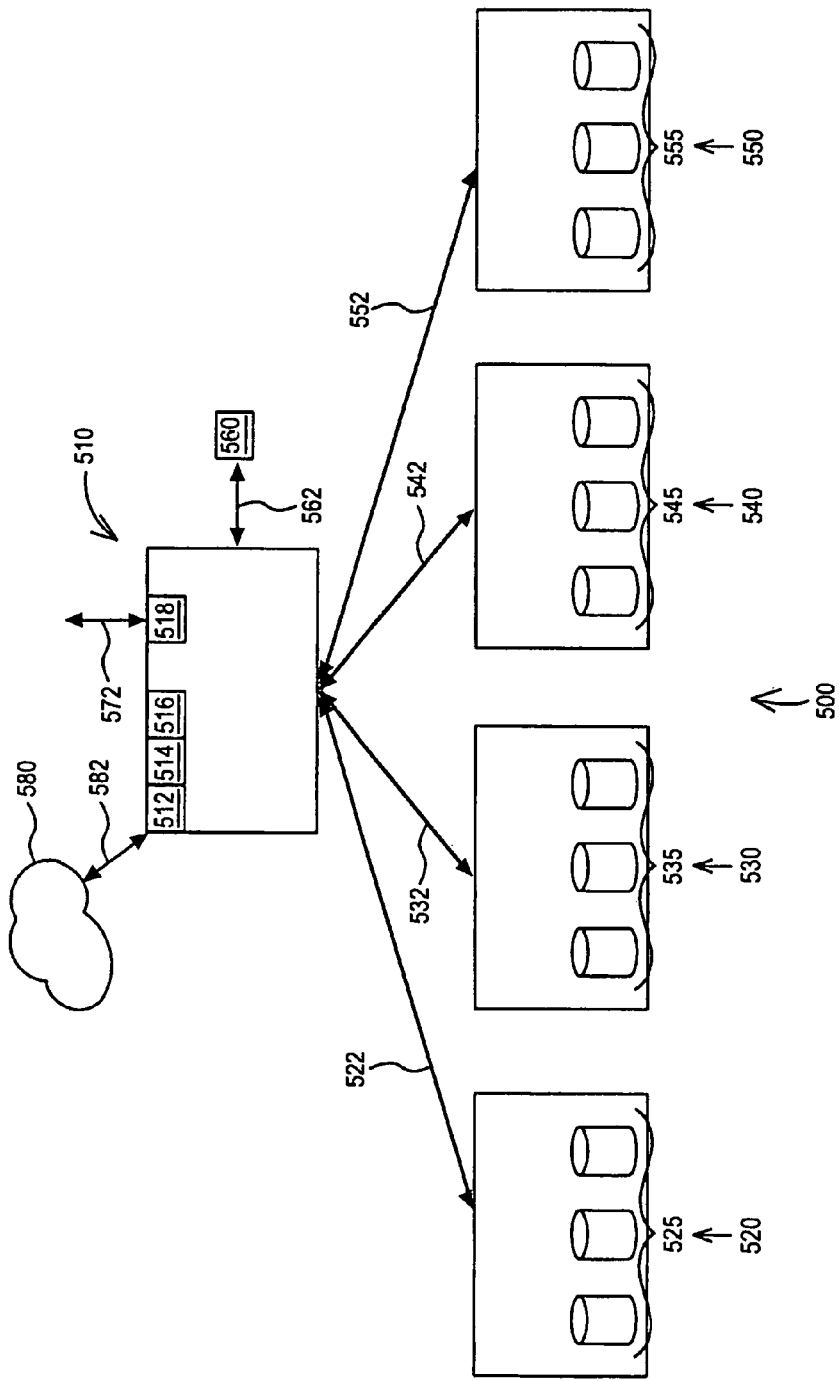
FIG. 5 is a block diagram showing one embodiment of Applicant's data processing system.

Referring now to FIG. 5, Applicant's data processing system includes a master controller 510 in combination with a plurality of information storage and retrieval systems. For example in the illustrated embodiment of FIG. 5, Applicant's data processing system 500 includes master controller 510 in combination with information storage and retrieval systems 520, 530, 540, and 550.

In certain embodiments, Applicant's system further includes a Storage Attached Network ("SAN") 580. In these embodiments, master controller 510 is capable of communicating with SAN 580 via communication link 582.

Master controller 510 includes processor 512, memory 514, and microcode 516. In certain embodiments, memory 514 comprises non-volatile memory, such as for example one or more EEPROMs (Electrically Erasable Programmable Read Only Memory), one or more flash PROMs (Programmable Read Only Memory), battery backup RAM, hard disk drive, combinations thereof, and the like.

In certain embodiments, master controller 510 further includes web server 518 which is capable of bidirectional communication using Internet access link 572. In certain embodiments, master controller 510 further includes operator input panel 560. In certain embodiments, operator input panel 560 is integral with master controller 510. In other embodiments, operator input panel is external to master controller 510. In these external embodiments, master controller 510 is capable of bidirectional communication with operator input panel 560 via communication link 562.

In the illustrated embodiment of FIG. 5, master controller 510 is external to each of Applicant's information storage and retrieval systems comprising system 500. In other embodiments, master controller 510 is integral with one of the information storage and retrieval systems comprising Applicant's data processing system.

Master controller 510 is capable of bidirectional communication with information storage and retrieval systems 520, 530, 540, and 550, using communication links 522, 532, 542, and 552, respectively. In the illustrated embodiment of FIG. 5, master controller 510 communicates directly with a plurality of information storage and retrieval systems. In other embodiments, master controller 510 communicates with a plurality of information storage and retrieval systems via a SAN, such as for example SAN 580. In yet other embodiments, master controller 510 communicates directly with one or more information storage and retrieval systems, and with one or other information storage and retrieval systems via a SAN, such as for example SAN 580.

Communication links 522, 532, 542, 552, 562, 572, and 582, are independently selected from the group comprising a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Information storage and retrieval system 520 includes a plurality of information storage media 525. In certain embodiments, plurality of information storage media 525 comprises one or more hard disk drives, one or more tape storage media, one or more optical storage media, one or more electronic storage media, and combinations thereof.

Information storage and retrieval system 530 includes a plurality of information storage media 535. In certain embodiments, plurality of information storage media 535 comprises one or more hard disk drives, one or more tape storage media, one or more optical storage media, one or more electronic storage media, and combinations thereof.

Information storage and retrieval system 540 includes a plurality of information storage media 545. In certain embodiments, plurality of information storage media 545 comprises one or more hard disk drives, one or more tape storage media, one or more optical storage media, one or more electronic storage media, and combinations thereof.

Information storage and retrieval system 550 includes a plurality of information storage media 555. In certain embodiments, plurality of information storage media 555 comprises one or more hard disk drives, one or more tape storage media, one or more optical storage media, one or more electronic storage media, and combinations thereof.

As those skilled in the art will appreciate, information and retrieval storage systems 520, 530, 540, and 550, may comprise elements in addition to the plurality of storage media shown. As those skilled in the art will further appreciate, such information storage and retrieval systems may further include, including without limitation, one or more processors, one or more data buffers, one or more DASD devices, one or more data caches, one or more input/output adapters, one or more storage device adapters, one or more operator input panels, one or more web servers, one or more robotic accessors, one or more data storage devices which include the plurality of storage media 525, and the like.

Figure 1:
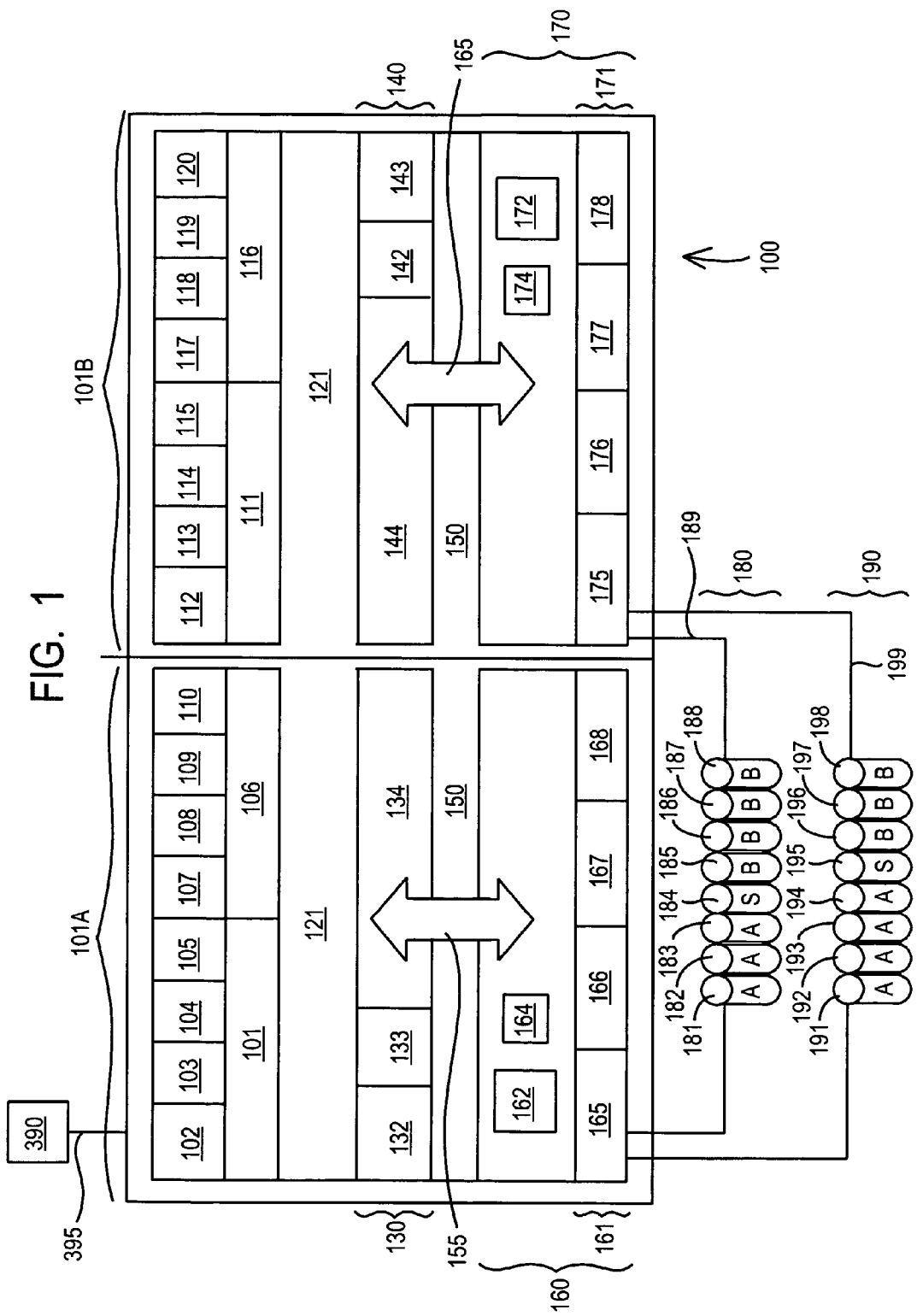
FIG. 1 is a block diagram showing one embodiment of Applicant's data storage and retrieval system.

Referring now to FIG. 1, in certain embodiments, one or more of information storage and retrieval systems 520 (FIG. 5), 530 (FIG. 5), 540 (FIG. 5), and/or 550 (FIG. 5) comprises information storage and retrieval system 100. Information storage and retrieval system 100 is capable of communication with host computer 390 via communication link 395. The illustrated embodiment of FIG. 1 shows a single host computer. In other embodiments, Applicant's information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicant's information storage and retrieval system 100 includes a plurality of host adapters 102-105, 107-110, 112-115, and 117-120, disposed in four host bays 101, 106, 111, and 116. In other embodiments, Applicant's information storage and retrieval system includes fewer than 16 host adapters. Regardless of the number of host adapters disposed in any embodiments of Applicant's system, each of those host adapters comprises a shared resource that has equal access to both central processing/cache elements 130 and 140. Each host adapter may comprise one or more Fibre Channel ports, one or more FICON ports, one or more ESCON ports, or one or more SCSI ports. Each host adapter is connected to both clusters through interconnect bus 121 such that each cluster can handle I/O from any host adapter.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of Applicant's system, one or more host adapters, processor portion 130, and one or more device adapters, are packaged together on a single card disposed in Applicant's information storage and retrieval system. Similarly, in certain embodiments, one or more host adapters, processor portion 130, and one or more device adapters, are disposed on another card disposed in Applicant's information storage and retrieval system. In these embodiments, Applicant's system 100 includes two cards interconnected with a plurality of data storage devices.

In the illustrated embodiment of FIG. 1, sixteen data storage devices are organized into two arrays, namely array "A" and array "B". The illustrated embodiment of FIG. 1 shows two storage device arrays. In other embodiments, Applicant's information storage and retrieval system includes more than two storage device arrays. Each storage array appears to a host computer as one or more logical devices.

In certain embodiments, one or more of the data storage devices comprise a plurality of hard disk drive units. In the illustrated embodiment of FIG. 1, disk array "A" includes disk drives 181, 182, 183, 191, 192, 193, and 194. Disk array "B" includes disk drives 185, 186, 187, 188, 196, 197, and 198. In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

The illustrated embodiment of FIG. 1 shows two storage device arrays. In other embodiments, Applicant's system includes a single storage device array. In yet other embodiments, Applicant's system includes more than two storage device arrays.

The loop structure shown in FIG. 1 comprises one embodiment of Applicant's system. In other embodiments, link 189 and/or 199 comprises a switched fabric or a combination of a switch and loop topologies. In other embodiments, link 189 and/or 199 comprises dual FC-AL loops of switches. Each loop contains one or more Fibre Channel switches. In yet other embodiments, link 189 and/or 199 utilize SSA looping technology.

In certain embodiments, one or more Applicant's information storage and retrieval systems 520, 530, 540, and/or 550, comprises an automated media library comprising a plurality of tape cartridges, one or more robotic accessors, and one or more tape drives. U.S. Pat. No. 5,970,030, assigned to the common assignee herein, describes such an automated media library and is hereby incorporated by reference. In certain embodiments, one or more of Applicant's information storage and retrieval systems 520, 530, 540, and/or 550, comprises a virtual tape system. U.S. Pat. No. 6,269,423, assigned to the common assignee herein, describes such a virtual tape system, and is hereby incorporated by reference.

Applicant's invention includes a method, using Applicant's apparatus, to validate the configuration of an information storage and retrieval system. By "validate the configuration," Applicant means examining the configuration of a first information storage and retrieval system, i.e. the source system, and then determining if the configuration of a second information storage and retrieval system, i.e. the target system, is compatible with the source system.

In certain embodiments, Applicants' method is employed when transferring the configuration of the source system to the target system. One or both of those system may comprise a virtual system. In certain embodiments of Applicant's method both the source and target systems are actual systems, i.e. this embodiments comprises an "online to online" configuration transfer. In other embodiments, Applicant's method comprises an "offline to online" configuration transfer to modify or load a physical/logical configuration onto a third on-line system. In yet other embodiments, Applicant's method comprises an "offline to offline" transfer to, for example, evaluate the performance characteristics of a certain physical/logical configuration.

Figure 2:
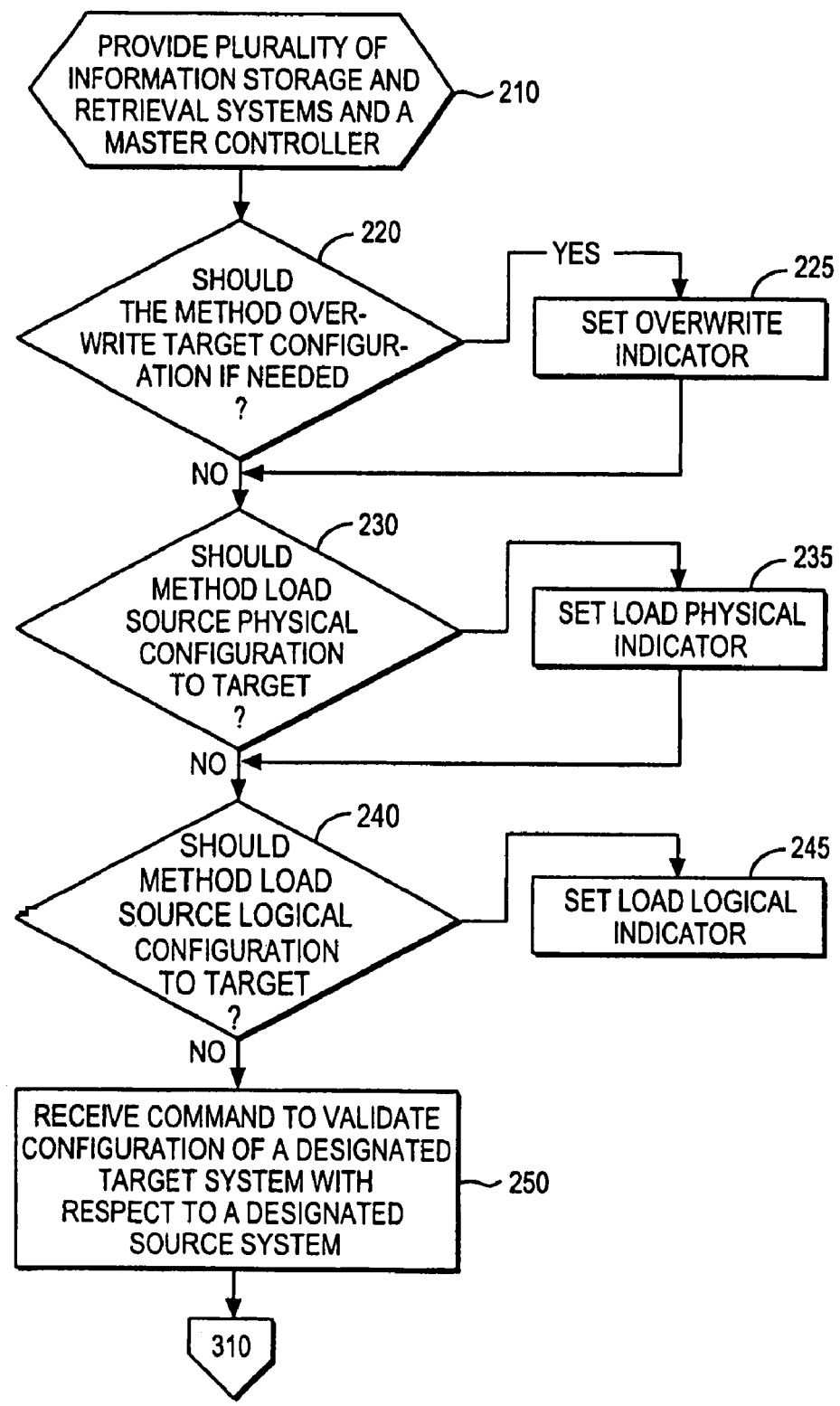
FIG. 2 is a flow chart summarizing the initial steps of Applicant's method.

FIG. 2 summarizes certain initial steps of Applicant's method. Referring now to FIG. 2, in step 210 the method provides a plurality of information storage and retrieval systems, for example systems 520 (FIG. 5), 530 (FIG. 5), 540 (FIG. 5), and 550 (FIG. 5), where each of those systems are capable of communicating with a master controller, such as for example master controller 510 (FIG. 5). The illustrated embodiment of FIG. 5 shows four such interconnected information storage and retrieval systems. In other embodiments of Applicant's method, the master controller is capable of communicating with fewer than four information storage and retrieval systems. In yet other embodiments of Applicant's method, the master controller is capable of communicating with more that four information storage and retrieval systems. One of the information storage and retrieval systems is designated a source system. Another of the information storage and retrieval system is designated the target system. As described above, either or both of the source and target systems may comprise a virtual system. Moreover, the target system may already include existing logical or physical configuration objects.

In step 220, Applicant's method selects whether, in certain embodiments of Applicant's method, to overwrite the configuration of the target information storage and retrieval system. In certain embodiments, the decision of step 220 is made by the owner and/or operator of the data processing system, such as for example the owner and/or operator of system 500 (FIG. 5). In certain embodiments, the owner/operator makes the election of step 220 via an operator input panel, such as for example operator input panel 560 (FIG. 5).

In other embodiments, the decision of step 220 is made by a host computer interconnected with one or more of the information storage and retrieval systems. In still other embodiments, the decision of step 220 is made by the manufacturer of the master controller, and firmware encoding that decision is disposed in a master controller, such as master controller 510 (FIG. 5). In yet other embodiments, the decision of step 220 is made during system start-up, and is encoded in microcode, such as microcode 516 (FIG. 5), disposed in a memory device, such as memory 514 (FIG. 5), disposed in the master controller, such as master controller 510 (FIG. 5).

If Applicant's method elects not to overwrite the configuration of the target system, then the method transitions from step 220 to step 230. Alternatively, if Applicant's method elects to allow an overwrite of the configuration of the target system, then the method transitions from step 220 to step 225 wherein the method sets an Overwrite Indicator. In certain embodiments, step 225 is performed by Applicant's master controller, such as master controller 510 (FIG. 5). In certain embodiments, Applicant's Overwrite Indicator comprises a flag which can be turned on or off. In certain embodiments, such a flag is disposed in device microcode disposed in the master controller. In certain embodiments, Applicant's Overwrite Indicator comprises a bit which can be set to either "0" or to "1". In certain embodiments, such a bit is disposed in device microcode disposed in the master controller. Applicant's method transitions from step 225 to step 230.

In step 230, Applicant's method selects whether, in certain embodiments of Applicant's method, to load the physical configuration from the source information storage and retrieval system to the target information storage and retrieval system. In certain embodiments, the decision of step 230 is made by the owner and/or operator of the data processing system, such as for example the owner and/or operator of system 500 (FIG. 5). In certain embodiments, the owner/operator makes the election of step 230 via an operator input panel, such as for example operator input panel 560 (FIG. 5).

In other embodiments, the decision of step 230 is made by a host computer interconnected with one or more of the information storage and retrieval systems. In still other embodiments, the decision of step 230 is made by the manufacturer of the master controller, and firmware encoding that decision is disposed in a master controller, such as master controller 510 (FIG. 5). In yet other embodiments, the decision of step 230 is made during system start-up, and is encoded in microcode, such as microcode 516 (FIG. 5), disposed in a memory device, such as memory 514 (FIG. 5), disposed in the master controller, such as master controller 510 (FIG. 5).

If Applicant's method elects not to load the physical configuration from the source information storage and retrieval system to the target information storage and retrieval system, then the method transitions from step 230 to step 240. Alternatively, if Applicant's method elects to load the physical configuration from the source information storage and retrieval system to the target information storage and retrieval system, then the method transitions from step 230 to step 235 wherein the method sets a Load Physical Indicator. In certain embodiments, step 235 is performed by Applicant's master controller, such as master controller 510 (FIG. 5). In certain embodiments, Applicant's Load Physical Indicator comprises a flag which can be turned on or off. In certain embodiments, such a flag is disposed in device microcode disposed in the master controller. In certain embodiments, Applicant's Load Physical Indicator comprises a bit which can be set to either "0" or to "1". In certain embodiments, such a bit is disposed in device microcode disposed in the master controller. Applicant's method transitions from step 235 to step 240.

In step 240, Applicant's method selects whether, in certain embodiments of Applicant's method, to load the logical configuration from the source information storage and retrieval system to the target information storage and retrieval system. In certain embodiments, the decision of step 240 is made by the owner and/or operator of the data processing system, such as for example the owner and/or operator of system 500 (FIG. 5). In certain embodiments, the owner/operator makes the election of step 240 via an operator input panel, such as for example operator input panel 560 (FIG. 5).

In other embodiments, the decision of step 240 is made by a host computer interconnected with one or more of the information storage and retrieval systems. In still other embodiments, the decision of step 240 is made by the manufacturer of the master controller, and firmware encoding that decision is disposed in a master controller, such as master controller 510 (FIG. 5). In yet other embodiments, the decision of step 240 is made during system start-up, and is encoded in microcode, such as microcode 516 (FIG. 5), disposed in a memory device, such as memory 514 (FIG. 5), disposed in the master controller, such as master controller 510 (FIG. 5).

If Applicant's method elects not to load the logical configuration from the source information storage and retrieval system to the target information storage and retrieval system, then the method transitions from step 240 to step 250. Alternatively, if Applicant's method elects to load the logical configuration from the source information storage and retrieval system to the target information storage and retrieval system, then the method transitions from step 240 to step 245 wherein the method sets a Load Logical Indicator. In certain embodiments, step 245 is performed by Applicant's master controller, such as master controller 510 (FIG. 5). In certain embodiments, Applicant's Load Logical Indicator comprises a flag which can be turned on or off. In certain embodiments, such a flag is disposed in device microcode disposed in the master controller. In certain embodiments, Applicant's Load Logical Indicator comprises a bit which can be set to either "0" or to "1". In certain embodiments, such a bit is disposed in device microcode disposed in the master controller. Applicant's method transitions from step 245 to step 250.

In step 250, Applicant's master controller receives a request, or a command, or instructions (collectively a "request") to validate the configuration of a designated second information storage and retrieval system, i.e. a "target" system, with reference to a designated first information storage and retrieval system, i.e. the "source" system. In certain embodiments, the target system comprises an extant system, such as for example one or more of systems 520 (FIG. 5), 530 (FIG. 5), 540 (FIG. 5), and/or 550 (FIG. 5). In other embodiments, the target system comprises a virtual configuration image. In certain of these virtual system embodiments, the target system will be used as a simulation tool to assist the optimization of extant systems.

In certain embodiments, the request of step 250 is provided by a host computer. In certain embodiments, the request of step 250 is provided by an operator using an operator control panel. In certain embodiments, the request of step 250 is received via the Internet. In certain embodiments, the request of step 250 is received via an interconnected SAN, such as for example SAN 580 (FIG. 5). In certain embodiments, the request of step 250 is received by Applicant's master controller, such as for example master controller 510 (FIG. 5).

In response to the request of step 250, Applicant's method transitions from step 250 to step 310, wherein the method queries the source system for the (i)th physical object, where (i) is initially set to 1. In certain embodiments, in step 310 Applicant's master controller identifies the (i)th physical object located at the (k)th location on the source system. As those skilled in the art will appreciate, such physical objects include, for example, device adapters, DDMs, and the like. In certain embodiments, step 310 is performed by Applicant's master controller, such as master controller 510 (FIG. 5).

Applicant's method transitions from step 310 to step 320 wherein the method queries the target system in an attempt to locate a corresponding physical object at a corresponding location. In certain embodiments, step 320 is performed by Applicant's master controller, such as master controller 510 (FIG. 5).

Applicant's method transitions from step 320 to step 330 wherein the method determines if the target system includes the (i)th physical object at the (k)th location. In certain embodiments, step 330 is performed by Applicant's master controller, such as master controller 510 (FIG. 5).

If Applicant's method determines in step 330 that the target system includes the (i)th physical object at the (k)th location, then the method transitions from step 330 to step 380 wherein the method determines if the source system includes additional physical objects to inventory. In certain embodiments, step 380 is performed by Applicant's master controller, such as master controller 510 (FIG. 5). If Applicant's method determines in step 380 that additional physical objects on the target system remain to be identified on the target system, then the method transitions from step 380 to step 390 wherein the method increments (i) by 1. In certain embodiments, step 390 is performed by Applicant's master controller, such as master controller 510 (FIG. 5). Applicant's method transitions from step 390 to step 310 and continues as described herein.

If Applicant's method determines in step 330 that the target system does not include the (i)th physical object at the (k)th location, then the method transitions from step 330 to step 340 wherein the method determines if the target system comprises a virtual configuration image. In certain embodiments, step 340 is performed by Applicant's master controller, such as master controller 510 (FIG. 5).

If Applicant's method determines in step 340 that the target system does comprise a virtual configuration image, then the method transitions from step 340 to step 350 wherein the method determines if a Load Physical Indicator is set. In certain embodiments, step 350 is performed by Applicant's master controller, such as master controller 510 (FIG. 5). If Applicant's method determines in step 350 that a Load Physical Indicator is set, then the method transitions from step 350 to step 370 wherein the method loads the (i)th physical object to the (k)th location on the target system. In certain embodiments, step 370 is performed by Applicant's master controller, such as master controller 510 (FIG. 5). Applicant's method transitions from step 370 to step 380 and continues as described herein.

If Applicant's method determines in step 340 that the target system is not a virtual configuration image, or if Applicant's method determines in step 350 that a Load Physical Indicator is not set, then Applicant's method transitions to step 360 wherein the method determines if the source includes a logical object corresponding to the (i)th physical object. In certain embodiments, step 360 is performed by Applicant's master controller, such as master controller 510 (FIG. 5).

If Applicant's method determines in step 360 that the source does not include a logical object corresponding to the (i)th physical object, then Applicant's method determines that the (i)th physical object is not required, and the method transitions from step 360 to step 380 and continues as described herein. Alternatively, if Applicant's method determines that the source does include a logical image corresponding to the (i)th physical object, then the method determines that the (i)th physical object is required, and the method transitions from step 360 to step 395 wherein the method generates an error message failing the configuration validation. In certain embodiments, step 395 is performed by Applicant's master controller, such as master controller 510 (FIG. 5).

In certain embodiments, Applicant's method in step 310 queries the first information storage system, i.e. the source system, for the existence and location of all physical objects, and then in step 320 queries the target system for all the corresponding physical objects and locations. In these embodiments, after once performing steps 310 and 320, Applicant's method proceeds seriatim through the remaining steps of FIG. 3 as described above for each object (i) and location (k) with respect to the physical objects and locations determined in steps 310 and 320.

Figure 4:
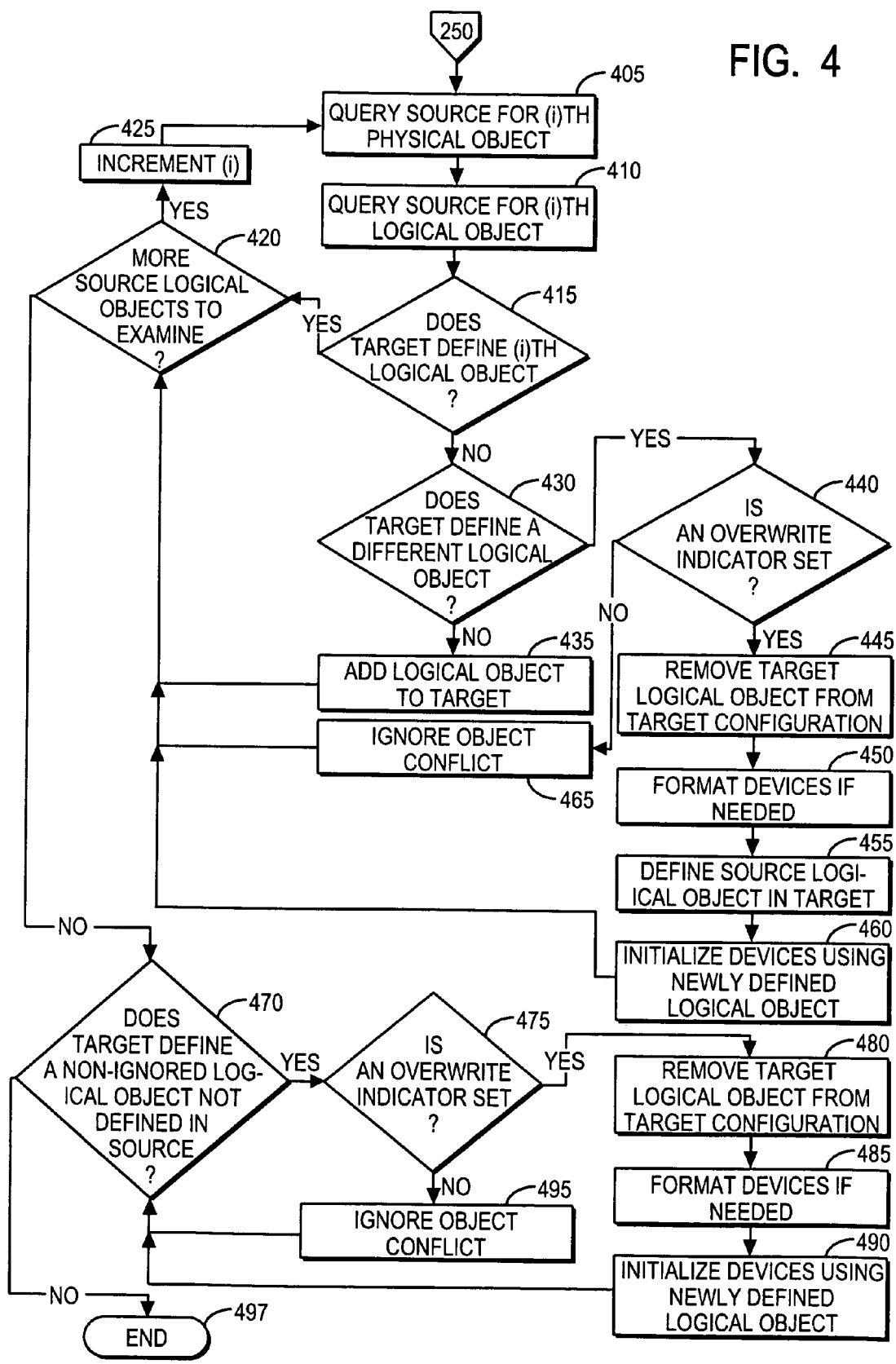
FIG. 4 is a flow chart summarizing additional steps in Applicant's method.

If Applicant's method determines in step 380 that the existence/location of additional physical objects resident on the source system do not remain to be examined on the target system, then Applicant's method transitions from step 380 to step 405 (FIG. 4). Referring now to FIG. 4, in step 405 wherein the method queries the source system for the (j)th logical object, where (j) is initially set to 1, i.e. Applicant's master controller identifies the (j)th logical object defined on the source system at the (m)th location. As those skilled in the art will appreciate, such logical objects include, for example, RAID ranks, storage arrays, volumes, Host LUNs, logical subsystems, logical control units, and the like. In certain embodiments, step 405 is performed by Applicant's master controller, such as master controller 510 (FIG. 5).

Applicant's method transitions from step 405 to step 410 wherein the method queries the target system in an attempt to locate the (j)th logical object. In certain embodiments, step 410 is performed by Applicant's master controller, such as master controller 510 (FIG. 5).

Applicant's method transitions from step 410 to step 415 wherein the method determines if the target system includes the (j)th logical object at the (m)th location. In certain embodiments, step 415 is performed by Applicant's master controller, such as master controller 510 (FIG. 5).

If Applicant's method determines in step 415 that the target system defines the (j)th logical object at the (m)th location, then the method transitions from step 415 to step 420 wherein the method determines if the source system includes addiitional logical objects to inventory. In certain embodiments, step 420 is performed by Applicant's master controller, such as master controller 510 (FIG. 5). If Applicant's method determines in step 420 that additional logical objects are defined on the source system, then the method transitions from step 420 to step 425 wherein the method increments (j) by 1. In certain embodiments, step 425 is performed by Applicant's master controller, such as master controller 510 (FIG. 5). Applicant's method transitions from step 425 to step 405 and continues as described herein.

If Applicant's method determines in step 415 that the target system does not define the (j)th logical object at the (m)th location, then the method transitions from step 415 to step 430 wherein the method determines if the target system defines a different logical object at the (m)th location. In certain embodiments, step 430 is performed by Applicant's master controller, such as master controller 510 (FIG. 5).

If Applicant's method determines in step 430 that the target system does not define a different logical object at the (m)th location, then the method transitions from step 430 to step 435 wherein the method adds the (k)th logical object to the (m)th location on the target system. In certain embodiments, step 435 is performed by Applicant's master controller, such as master controller 510 (FIG. 5). Applicant's method transitions from step 435 to step 420 and continues as described herein.

Alternatively, if Applicant's method determines in step 430 that the target system does define a different logical object at the (m)th location, then the method transitions from step 430 to step 440 wherein the method determines if an Overwrite Indicator is set. In certain embodiments, step 440 is performed by Applicant's master controller, such as master controller 510 (FIG. 5).

If Applicant's method determines in step 440 that an Overwrite Indicator is not set, then the method transitions from step 440 to step 465 wherein the method ignores the logical object conflict, and then transitions from step 465 to step 420 and continues as described herein. Alternatively, if Applicant's method determines in step 440 that an Overwrite Indicator is set, then the method transitions from step 440 to step 445 wherein the method removes the logical object originally defined in the target system at the (m)th location. In certain embodiments, step 445 is performed by Applicant's master controller, such as master controller 510 (FIG. 5). Applicant's method transitions from step 445 to step 450 wherein the method formats one or more devices, if such reformatting is required after performing step 445. In certain embodiments, step 450 is performed by Applicant's master controller, such as master controller 510 (FIG. 5).

Applicant's method transitions from step 450 to step 455 wherein the method defines the (k)th logical object at the (m)th location in the target system. In certain embodiments, step 445 is performed by Applicant's master controller, such as master controller 510 (FIG. 5). Applicant's method transitions from step 455 to step 460 wherein the method initializes one or more devices, if such initialization is required after performing steps 445, 450, and 455. In certain embodiments, step 460 is performed by Applicant's master controller, such as master controller 510 (FIG. 5). Applicant's method transitions from step 460 to step 420 and continues as described herein.

If Applicant's method determines in step 420 that all the logical objects defined in the source system have been inventoried, then the method transitions from step 420 to step 470 wherein the method determines if the target system defines one or more logical items that are not defined in the source system. In certain embodiments, step 470 is performed by Applicant's master controller, such as master controller 510 (FIG. 5).

If Applicant's method determines in step 470 that the target system defines one or more logical items that are not defined in the source system, then the method transitions from step 470 to step 475 wherein the method determines if an Overwrite Indicator is set. In certain embodiments, step 475 is performed by Applicant's master controller, such as master controller 510 (FIG. 5). If Applicant's method determines in step 475 that an Overwrite Indicator is not set, then the method transitions from step 475 to step 495 wherein the method ignores the logical object conflict, and transitions from step 495 to step 470 and sequentially examines each target object not defined in the source configuration. In certain embodiments, step 495 is performed by Applicant's master controller, such as master controller 510 (FIG. 5).

Alternatively, if Applicant's method determines in step 475 that an Overwrite Indicator is set, then the method transitions from step 475 to step 480 wherein the method removes from the target system the logical object not defined in the source system. In certain embodiments, step 480 is performed by Applicant's master controller, such as master controller 510 (FIG. 5).

Applicant's method transitions from step 480 to step 485 wherein the method formats one or more devices, if such reformatting is required after performing step 480. In certain embodiments, step 485 is performed by Applicant's master controller, such as master controller 510 (FIG. 5).

Applicant's method transitions from step 485 to step 490 wherein the method initializes one or more devices, if such initialization is required after performing steps 480 and 485. In certain embodiments, step 490 is performed by Applicant's master controller, such as master controller 510 (FIG. 5). Applicant's method transitions from step 490 to step 470 and continues as described herein. If Applicant's method determines in step 470 that the target system does not define any additional logical objects that are not defined in the source system, the method transitions from step 470 to step 497 and ends.

Figure 3:
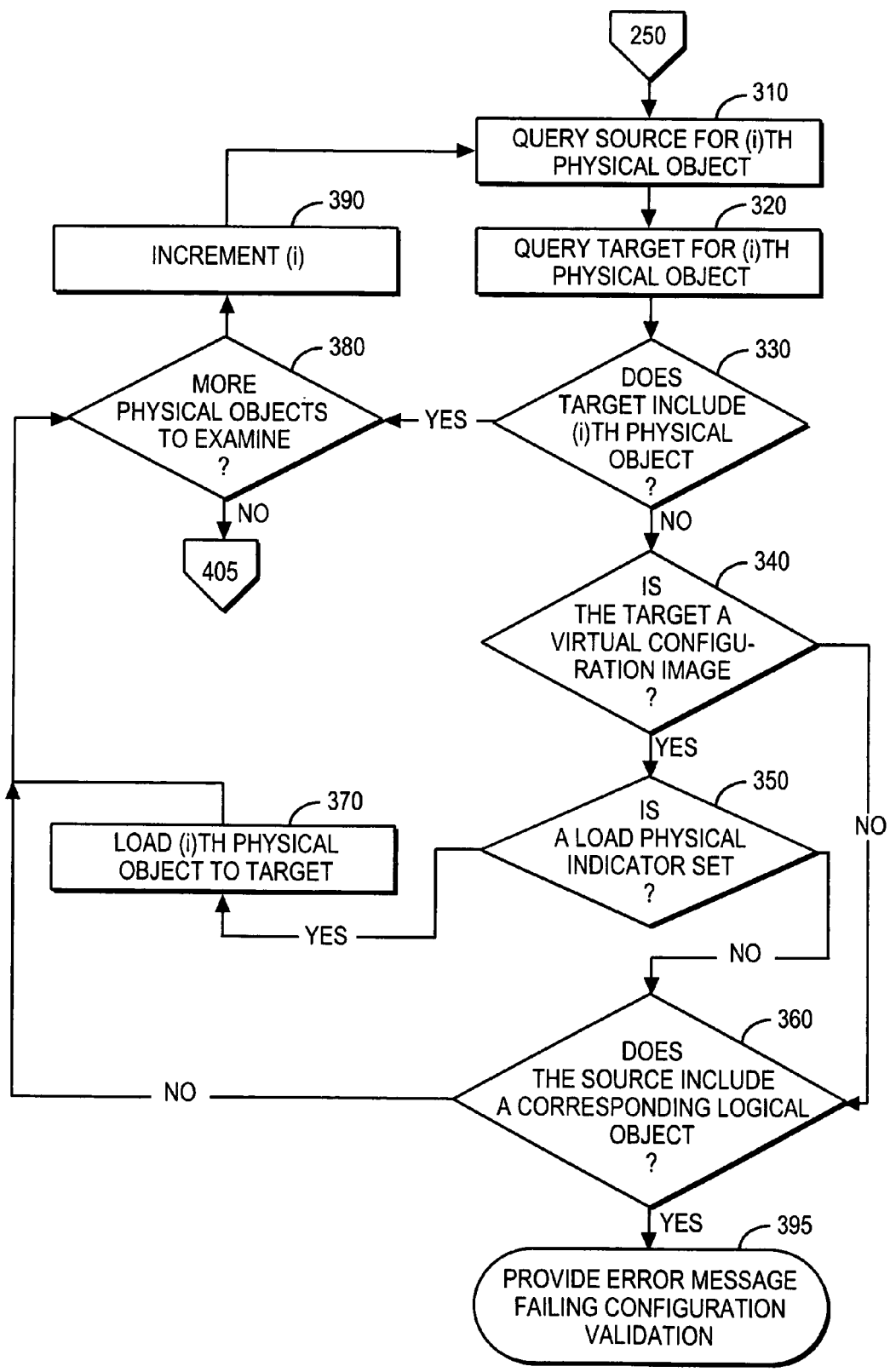
FIG. 3 is a flow chart summarizing additional steps in Applicant's method.

In certain embodiments, Applicant's invention includes instructions, such as instructions 518 (FIG. 5), where those instructions are executed by processor 512 (FIG. 5) to perform step 250 recited in FIG. 2, and/or steps 310, 320, 330, 340, 350, 360, 370, 380, 390, and/or 395, recited in FIG. 3, and/or steps 405, 410, 415, 420, 525, 430, 435, 440, 445, 450, 455, 460, 465, 470, 475, 480, 485, 490, 495, and/or 497, recited in FIG. 4.

In other embodiments, Applicant's invention includes instructions residing in any other computer program product, where those instructions are executed by a computer external to, or internal to, master controller 510, to perform step 250 recited in FIG. 2, and/or steps 310, 320, 330, 340, 350, 360, 370, 380, 390, and/or 395, recited in FIG. 3, and/or steps 405, 410, 415, 420, 525, 430, 435, 440, 445, 450, 455, 460, 465, 470, 475, 480, 485, 490, 495, and/or 497, recited in FIG. 4. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method to validate the configuration of an information storage and retrieval system, comprising the steps of:
   providing a source information storage and retrieval system comprising (N) physical objects and (M) logical objects;
   providing a target information storage and retrieval system;
   providing a master controller in communication with said source information storage and retrieval system and with said target information storage and retrieval system, wherein said master controller comprises a processor, memory, an Overwrite Indicator, a Load Physical Indicator, and a Load Logical Indicator;
   when overwriting the configuration of said target information storage and retrieval system, setting said Overwrite Indicator;
   when loading the physical configuration of said source information storage and retrieval system to said target information storage and retrieval system, setting said Load Physical Indicator;
   when loading the logical configuration of said source information storage and retrieval system to said target information storage and retrieval system, setting said Load Logical Indicator;
   receiving a command to validate the configuration of said target information storage and retrieval system with respect to said source information storage and retrieval system, wherein said source information storage and retrieval system comprises an (i)th physical object, wherein (i) is greater than or equal to 1 and less than or equal to (N);
   when said source information storage and retrieval system comprises a logical object corresponding to said (i)th physical object, and when said target information storage and retrieval system does not include said (i)th physical object, providing an error message failing said configuration validation.

2. The method of claim 1, further comprising the steps of supplying a host computer, wherein said command is provided by said host computer.

3. The method of claim 1, further comprising the step of supplying a master controller interconnected with a plurality of information storage and retrieval systems, wherein said command is provided by said master controller.

4. The method of claim 3, further comprising the steps of supplying an operator control panel interconnected to said master controller, wherein said command is provided by an operator using said operator control panel.

5. The method of claim 3, wherein said master controller comprises a web server capable of bidirectional communication using the Internet, further comprising the step of receiving said command via the Internet.

6. The method of claim 1, wherein said target information storage and retrieval system comprises a virtual configuration image, and wherein a load physical indicator is set, further comprising the step of loading said (i)th physical object to said target information storage and retrieval system.

7. The method of claim 1, wherein a (j)th logical object is defined at an (m)th location in said source information storage and retrieval system, and wherein said target information storage and retrieval system does not define said (j)th logical object at the (m)th location, and wherein said target information storage and retrieval system does not define a different logical object at said (m)th location, further comprising the step of adding said (j)th logical object to said target information storage and retrieval system at said (m)th location.

8. The method of claim 1, wherein a (j)th logical object is defined at an (m)th location in said source information storage and retrieval system, and wherein said target information storage and retrieval system does not define said (j)th logical object at the (m)th location, and wherein said target information storage and retrieval system defines a different logical object at said (m)th location, and wherein an overwrite indicator is not set, further comprising the step of ignoring the conflict between the logical object defined at the (m)th location in the source system and the logical object defined at the (m)th location in the target system.

9. The method of claim 1, wherein a (j)th logical object is defined at an (m)th location in said source information storage and retrieval system, and wherein said target information storage and retrieval system does not define said (j)th logical object at the (m)th location, and wherein said target information storage and retrieval system defines a different logical object at said (m)th location, and wherein an overwrite indicator is set, further comprising the steps of:
   removing the logical object initially defined at the (m)th location in the target information storage and retrieval system; and
   defining at the (m)th location in the target information storage and retrieval system the (j)th logical object defined in the source information storage and retrieval system.

10. The method of claim 1, wherein said target information storage and retrieval system defines a logical object not defined in the source information storage and retrieval system, and wherein an overwrite indicator is not set, further comprising the step of ignoring the conflict between the logical object defined in the target information storage and retrieval system but not defined in the source information storage and retrieval system.

11. The method of claim 1, wherein said target information storage and retrieval system defines a logical object not defined in said source information storage and retrieval system, and wherein an overwrite indicator is set, further comprising the step of removing from said target information storage and retrieval system the logical object defined in the target information storage and retrieval system but not defined in the source information storage and retrieval system.

12. A master controller comprising a processor, memory, an Overwrite Indicator, a Load Physical Indicator, a Load Logical Indicator, and a computer readable medium having computer readable program code disposed therein to validate the configuration of an information storage and retrieval system, wherein said master controller is capable of communicating with a source information storage and retrieval system comprising (N) physical objects and (M) logical objects, and wherein said article of manufacture is capable of communicating with a target information storage and retrieval system, the computer readable program code comprising a series of computer readable program steps to effect:

when overwriting the configuration of said target information storage and retrieval system, setting said Overwrite Indicator;
   when loading the physical configuration of said source information storage and retrieval system to said target information storage and retrieval system, setting said Load Physical Indicator;
   when loading the logical configuration of said source information storage and retrieval system to said target information storage and retrieval system, setting said Load Logical Indicator;
   receiving a command to validate the configuration of said target information storage and retrieval system with respect to said source information storage and retrieval system, wherein said source information storage and retrieval system comprises an (i)th physical object, wherein (i) is greater than or equal to 1 and less than or equal to (N);
   when said source information storage and retrieval system comprises a logical object corresponding to said (i)th physical object, and when said target information storage and retrieval system does not include said (i)th physical object, providing an error message failing said configuration validation.

13. The master controller of claim 12, said computer readable program code further comprising a series of computer readable program steps to effect receiving said command from a host computer.

14. The master controller of claim 12, said computer readable program code further comprising a series of computer readable program steps to effect receiving said command from a master controller interconnected with a plurality of information storage and retrieval systems.

15. The master controller of claim 14, said computer readable program code further comprising a series of computer readable program steps to effect receiving said command from an operator control panel interconnected to said master controller.

16. The master controller of claim 14, wherein said master controller comprises a web server capable of bidirectional communication using the Internet, said computer readable program code further comprising a series of computer readable program steps to effect receiving said command via the Internet.

17. The master controller of claim 12, wherein said target information storage and retrieval system comprises a virtual configuration image, and wherein a load physical indicator is set, said computer readable program code further comprising a series of computer readable program steps to effect loading said (i)th physical object to said target information storage and retrieval system.

18. The master controller of claim 12, wherein a (j)th logical object is defined at an (m)th location in said source information storage and retrieval system, and wherein said target information storage and retrieval system does not define said (j)th logical object at the (m)th location, and wherein said target information storage and retrieval system does not define a different logical object at said (m)th location, said computer readable program code further comprising a series of computer readable program steps to effect adding said (j)th logical object to said target information storage and retrieval system at said (m)th location.

19. The master controller of claim 12, wherein a (j)th logical object is defined at an (m)th location in said source information storage and retrieval system, and wherein said target information storage and retrieval system does not define said (j)th logical object at the (m)th location, and wherein said target information storage and retrieval system defines a different logical object at said (m)th location, and wherein an overwrite indicator is not set, said computer readable program code further comprising a series of computer readable program steps to effect ignoring the conflict between the logical object defined at the (m)th location in the source system and the logical object defined at the (m)th location in the target system.

20. The master controller of claim 12, wherein a (j)th logical object is defined at an (m)th location in said source information storage and retrieval system, and wherein said target information storage and retrieval system does not define said (j)th logical object at the (m)th location, and wherein said target information storage and retrieval system defines a different logical object at said (m)th location, and wherein an overwrite indicator is set, said computer readable program code further comprising a series of computer readable program steps to effect:
   removing the logical object initially defined at the (m)th location in the target information storage and retrieval system; and
   defining at the (m)th location in the target information storage and retrieval system the (j)th logical object defined in the source information storage and retrieval system.

21. The master controller of claim 12, wherein said target information storage and retrieval system defines a logical object not defined in the source information storage and retrieval system, and wherein an overwrite indicator is not set, said computer readable program code further comprising a series of computer readable program steps to effect ignoring the conflict between the logical object defined in the target information storage and retrieval system but not defined in the source information storage and retrieval system.

22. The master controller of claim 12, wherein said target information storage and retrieval system defines a logical object not defined in said source information storage and retrieval system, and wherein an overwrite indicator is set, said computer readable program code further comprising a series of computer readable program steps to effect removing from said target information storage and retrieval system the logical object defined in the target information storage and retrieval system but not defined in the source information storage and retrieval system.

23. A computer program product encoded in an information storage medium and usable with a programmable computer processor disposed in a master controller comprising an Overwrite Indicator, a Load Physical Indicator, and a Load Logical Indicator, to validate the configuration of an information storage and retrieval system, comprising:
   computer readable program code which, when overwriting the configuration of said target information storage and retrieval system, causes said programmable computer processor to set said Overwrite Indicator;
   computer readable program code which, when loading the physical configuration of said source information storage and retrieval system to said target information storage and retrieval system, causes said programmable computer processor to set said Load Physical Indicator;
   computer readable program code which, when loading the logical configuration of said source information storage and retrieval system to said target information storage and retrieval system, causes said programmable computer processor to set said Load Logical Indicator;
   computer readable program code which causes said programmable computer processor to receive a command to validate the configuration of said target information storage and retrieval system with respect to said source information storage and retrieval system, wherein said source information storage and retrieval system comprises an (i)th physical object, wherein (i) is greater than or equal to 1 and less than or equal to (N);
   computer readable program code which, when said source information storage and retrieval system comprises a logical object corresponding to said (i)th physical object and when said target information storage and retrieval system does not include said (i)th physical object, causes said programmable computer processor to provide an error message failing said configuration validation.

24. The computer program product of claim 23, further comprising computer readable program code which causes said programmable computer processor to receive said command from a host computer.

25. The computer program product of claim 23, further comprising computer readable program code which causes said programmable computer processor to receive said command from a master controller interconnected with a plurality of information storage and retrieval systems.

26. The computer program product of claim 25, further comprising computer readable program code which causes said programmable computer processor to receive said command from an operator control panel interconnected to said master controller.

27. The computer program product of claim 25, wherein said master controller comprises a web server capable of bidirectional communication using the Internet, further comprising computer readable program code which causes said programmable computer processor to receive said command via the Internet.

28. The computer program product of claim 23, wherein said target information storage and retrieval system comprises a virtual configuration image, and wherein a load physical indicator is set, further comprising computer readable program code which causes said programmable computer processor to load said (i)th physical object to said target information storage and retrieval system.

29. The computer program product of claim 23, wherein a (j)th logical object is defined at an (m)th location in said source information storage and retrieval system, and wherein said target information storage and retrieval system does not define said (j)th logical object at the (m)th location, and wherein said target information storage and retrieval system does not define a different logical object at said (m)th location, further comprising computer readable program code which causes said programmable computer processor to add said (j)th logical object to said target information storage and retrieval system at said (m)th location.

30. The computer program product of claim 23, wherein a (j)th logical object is defined at an (m)th location in said source information storage and retrieval system, and wherein said target information storage and retrieval system does not define said (j)th logical object at the (m)th location, and wherein said target information storage and retrieval system defines a different logical object at said (m)th location, and wherein an overwrite indicator is not set, further comprising computer readable program code which causes said programmable computer processor to ignore the conflict between the logical object defined at the (m)th location in the source system and the logical object defined at the (m)th location in the target system.

31. The computer program product of claim 23, wherein a (j)th logical object is defined at an (m)th location in said source information storage and retrieval system, and wherein said target information storage and retrieval system does not define said (j)th logical object at the (m)th location, and wherein said target information storage and retrieval system defines a different logical object at said (m)th location, and wherein an overwrite indicator is set, further comprising:

computer readable program code which causes said programmable computer processor to remove the logical object initially defined at the (m)th location in the target information storage and retrieval system; and computer readable program code which causes said programmable computer processor to define at the (m)th location in the target information storage and retrieval system the (j)th logical object defined in the source information storage and retrieval system.

32. The computer program product of claim 23, wherein said target information storage and retrieval system defines a logical object not defined in the source information storage and retrieval system, and wherein an overwrite indicator is not set, further comprising computer readable program code which causes said programmable computer processor to ignore the conflict between the logical object defined in the target information storage and retrieval system but not defined in the source information storage and retrieval system.

33. The computer program product of claim 23, wherein said target information storage and retrieval system defines a logical object not defined in said source information storage and retrieval system, and wherein an overwrite indicator is set, further comprising computer readable program code which causes said programmable computer processor to remove from said target information storage and retrieval system the logical object defined in the target information storage and retrieval system but not defined in the source information storage and retrieval system.

\* \* \* \* \*